Sept. 17, 1940.   A. M. BROWN   2,214,899
WELDING METHOD AND APPARATUS
Filed May 12, 1938   5 Sheets-Sheet 1
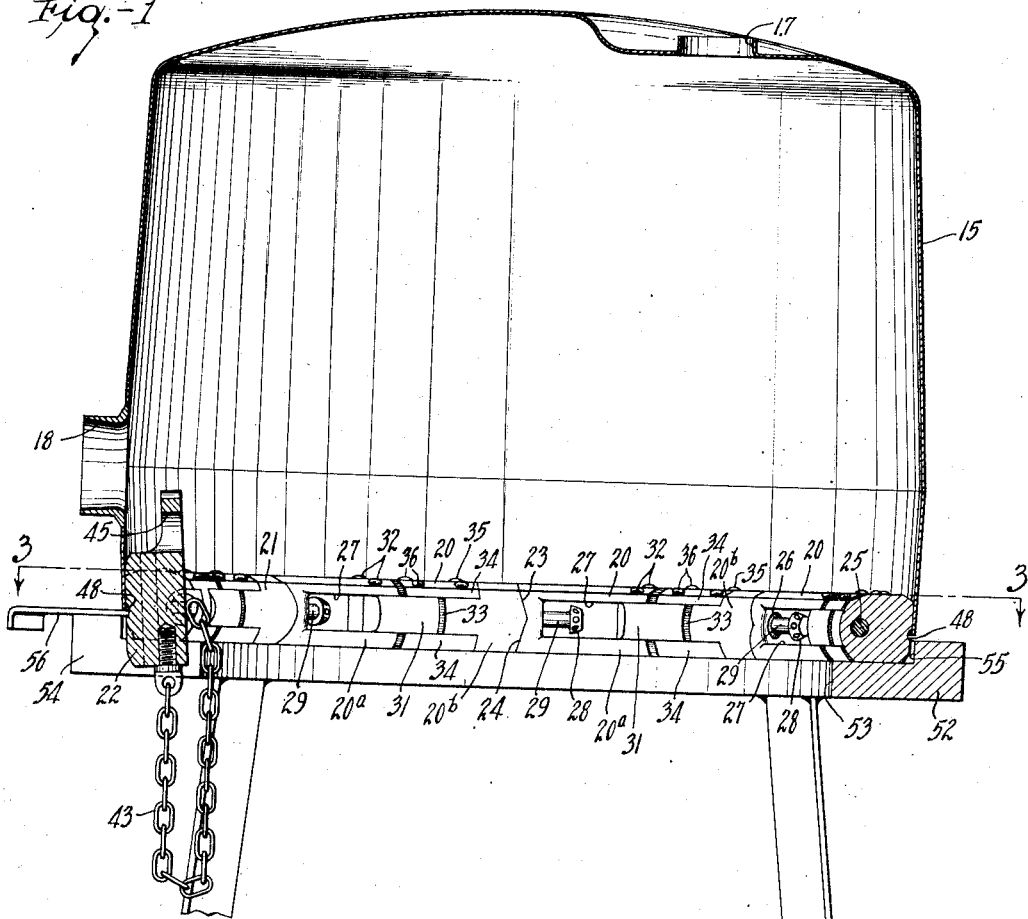
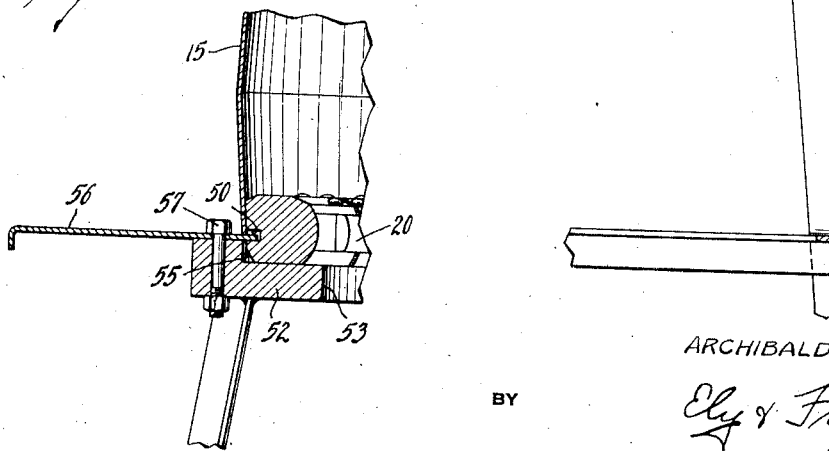
INVENTOR
ARCHIBALD M. BROWN
BY
Ely & Frye
ATTORNEYS Sept. 17, 1940.  A. M. BROWN  2,214,899
WELDING METHOD AND APPARATUS
Filed May 12, 1938  5 Sheets-Sheet 2

INVENTOR
ARCHIBALD M. BROWN
By Ely & Frye
ATTORNEYS

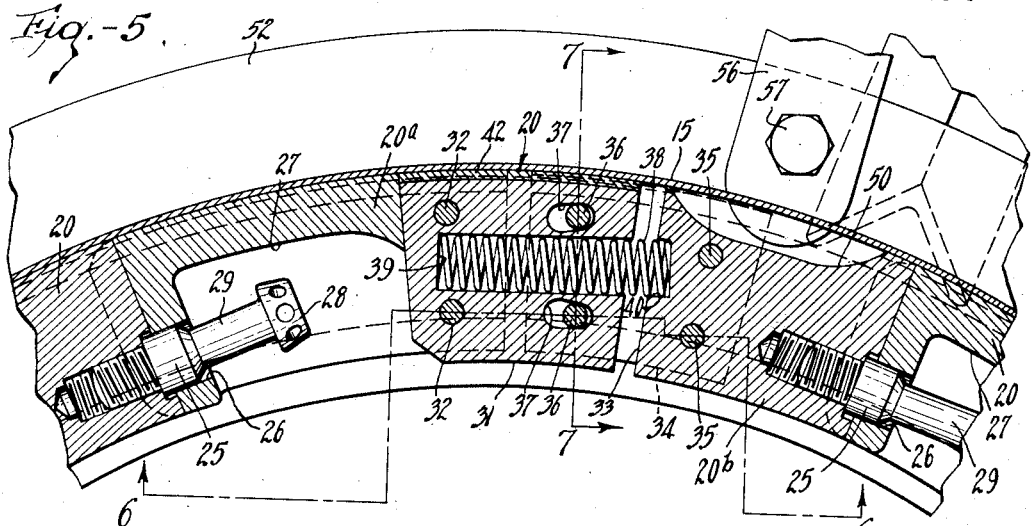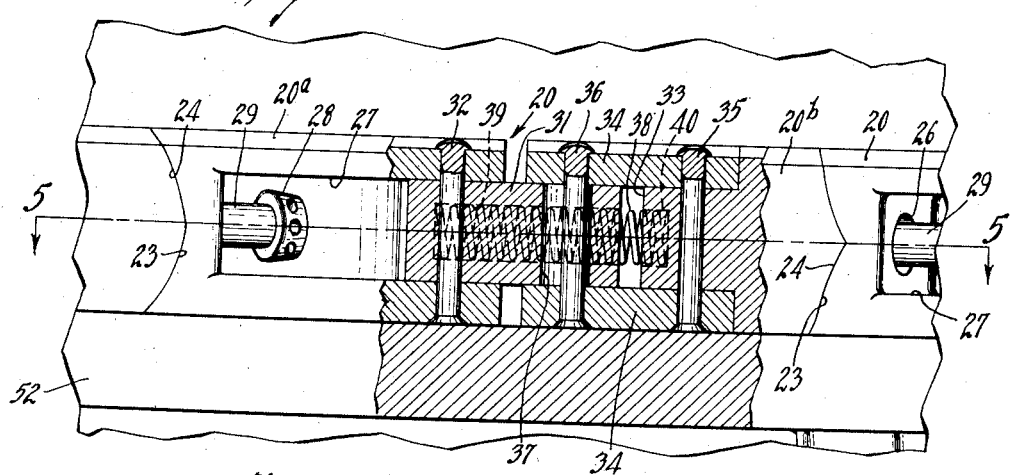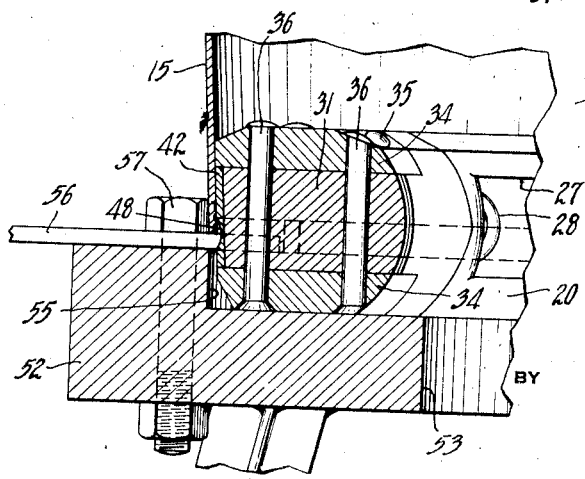

Sept. 17, 1940.  A. M. BROWN  2,214,899
WELDING METHOD AND APPARATUS
Filed May 12, 1938   5 Sheets-Sheet 4
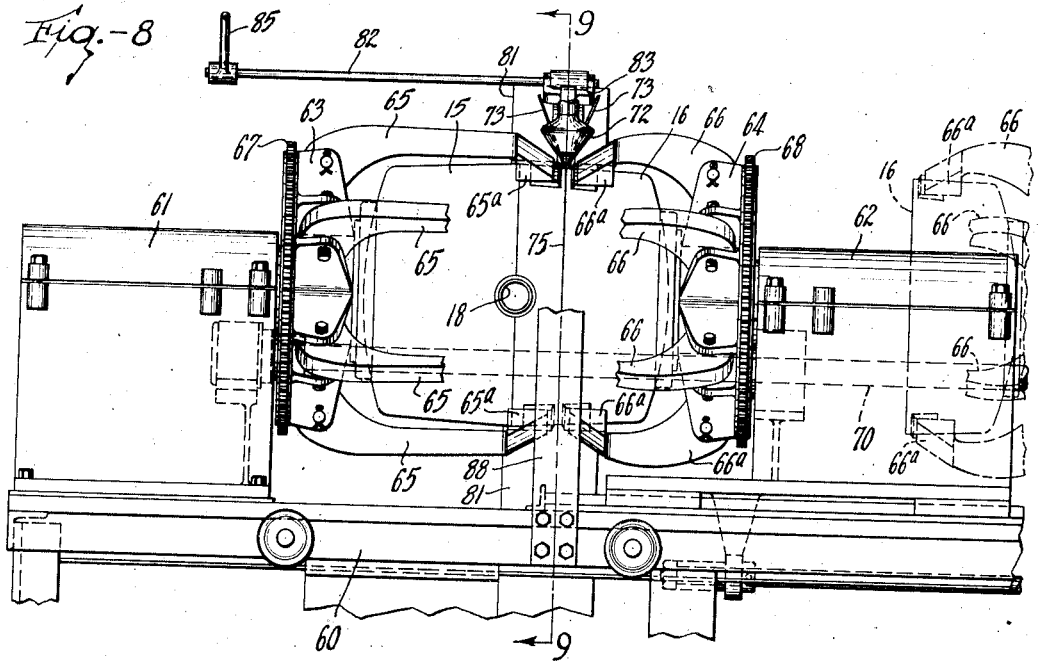
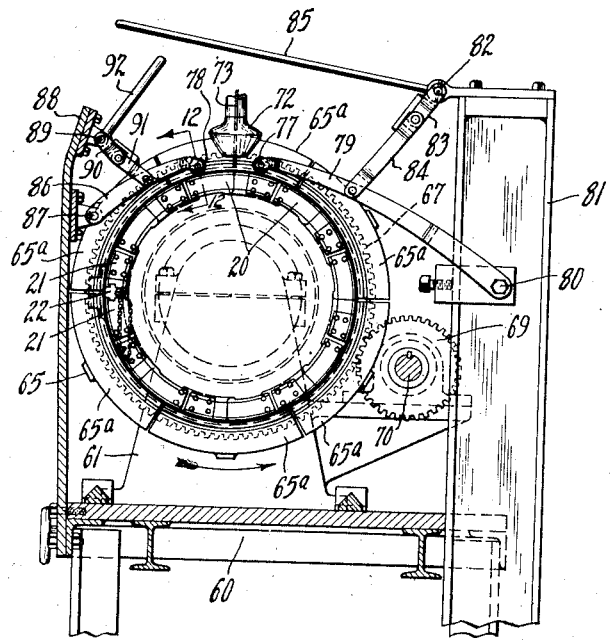
INVENTOR
ARCHIBALD M. BROWN
BY
ATTORNEYS Sept. 17, 1940.                A. M. BROWN                2,214,899
                        WELDING METHOD AND APPARATUS
                          Filed May 12, 1938          5 Sheets—Sheet 5
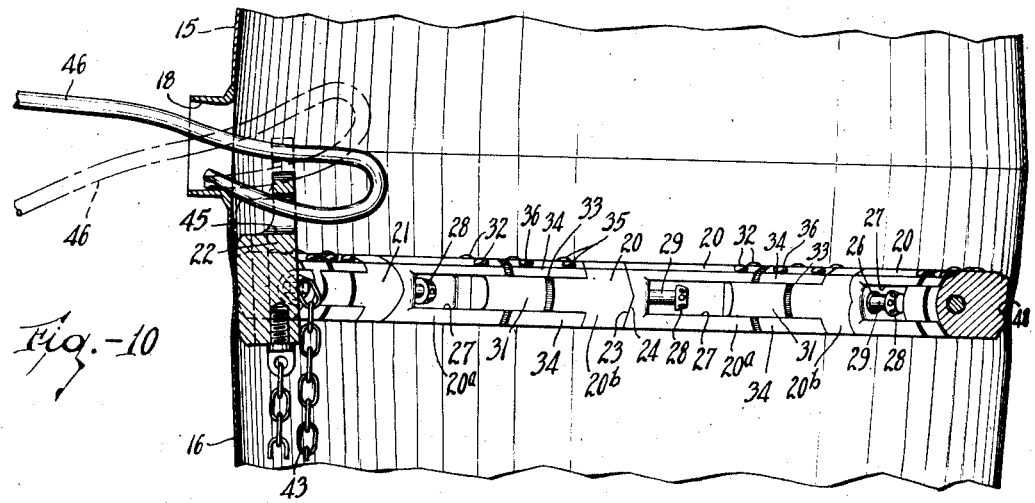
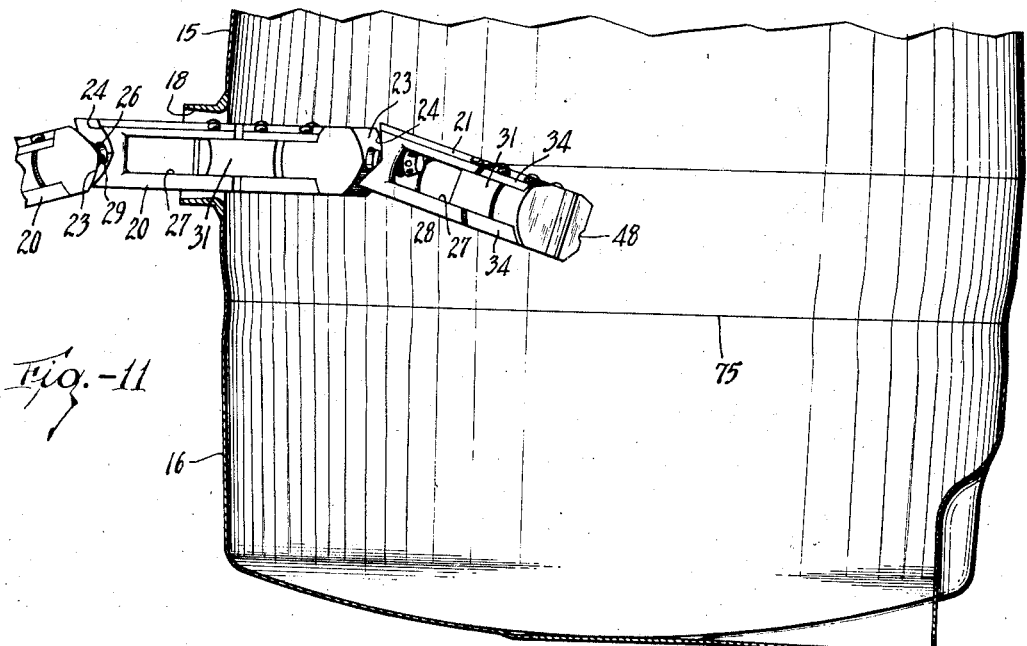
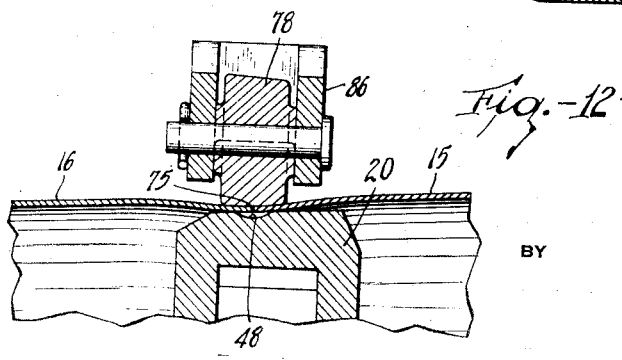
INVENTOR
ARCHIBALD M. BROWN
BY
ATTORNEYS Patented Sept. 17, 1940

2,214,899

UNITED STATES PATENT OFFICE 2,214,899

WELDING METHOD AND APPARATUS

Archibald M. Brown, Akron, Ohio, assignor, by mesne assignments, to The Firestone Tire & Rubber Company, Akron, Ohio, a corporation of Ohio Application May 12, 1938, Serial No. 207,541

4 Claims. (Cl. 113—59)

This invention relates to welding methods and apparatus, and more especially it relates to improved procedure and improved mechanism for welding together two dished structures that together constitute a hollow closed vessel.

The invention is of primary utility in the manufacture of metal barrels wherein the inner shell or lining thereof is composed of corrosion-resisting material such as stainless steel. Barrel linings of the character mentioned are made in two sections, each of which is a one-piece, drawn metal structure, said sections being united by a circumferential seam. Union of the two sections is effected by the process known as atomic welding, which consists in the fusing together of abutting margins of the barrel sections without the addition of any bonding metal thereto. During the welding operation, two margins to be welded require to be supported from the interior of the barrel structure, and heretofore this has been accomplished by means of a supporting roller journaled in the end of an arm, said arm extending through an axial aperture in one of the barrel sections and being supported exteriorly thereof. After the barrel sections were welded together and supporting arm withdrawn, the axial aperture required to be closed by an additional welding operation. Due to stresses set up by shrinkage of material upon cooling, and because the product is a closed vessel, structures of the character mentioned have been subject to small fissure-like cracks that develop during the welding operation. Such fissures or cracks result in defective barrels and considerable difficulty has been experienced in avoiding them.

The chief objects of the invention are to provide an improved method and improved apparatus for the welding of barrel linings of the character mentioned; to avoid the necessity for aperturing the barrel lining solely to admit a seam-supporting structure; to provide for compensating shrinkage stresses and thereby to avoid fissures and cracks arising therefrom; to save time and labor in the manufacture of metal barrels; to avoid loss and waste due to defective work; and to provide uniformity of product. More specifically, the invention aims to provide a collapsible seam-supporting structure that may be removed from the finished barrel lining through one of the normal openings therein, such as the bung hole; and to provide a seam-supporting structure of a yielding nature which will permit flexure of the work at the welding zone to the end that fissures and cracks may be avoided. Other objects will be manifest as the specification proceeds.

Of the accompanying drawings:

Figure 1 is a vertical diametric section through a barrel-lining structure, and a jointed seam-supporting structure operatively associated therewith, as they appear during assembly thereof, said section being taken on line 1—1 of Figure 3;

Figure 2 is a detail sectional view taken on the line 2—2 of Figure 3;

Figure 5 is a detail section on the line 5—5 of Figure 6, showing the construction of the jointed seam-supporting structure at one of the joints thereof;

Figure 6 is a section on the line 6—6 of Figure 5;

Figure 7 is a section on the line 7—7 of Figure 5;

Figure 8 is a front elevation of atomic welding apparatus, and the work therein;

Figure 9 is a section on the line 9—9 of Figure 8;

Figure 10 is a fragmentary section through a finished barrel lining showing the first step of removing the seam-supporting structure;

Figure 11 is a view similar to Figure 10, showing the final phase of the removal of the seam-supporting structure; and Figure 12 is a section, on a larger scale, on the line 12—12 of Figure 9, showing how the seam of the work is locally deformed in the region where the welding is being effected.

Figure 3:
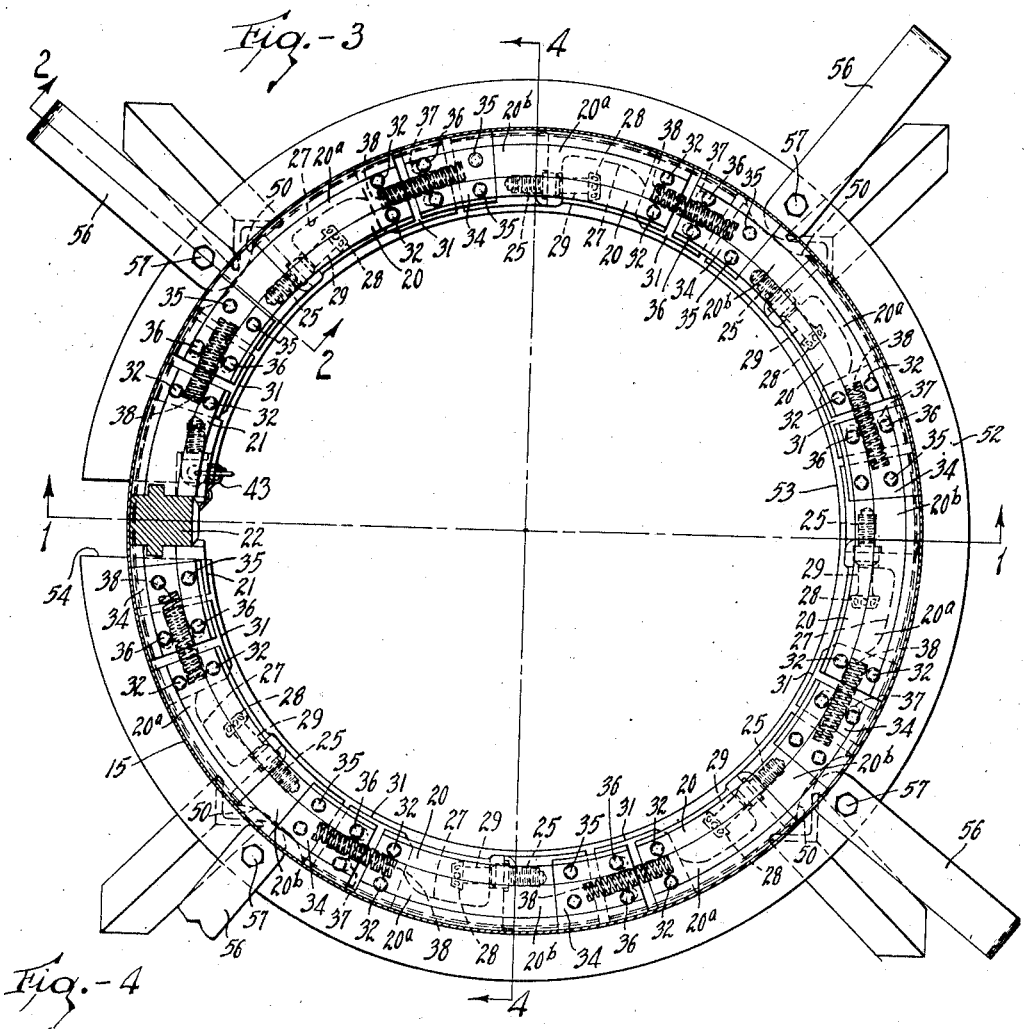
Figure 3 is a section on the line 3—3 of Figure 1, showing the seam-supporting structure in plan.

Referring to the drawings, there is shown therein apparatus for uniting two barrel-lining sections in a welded, circumferential seam. The barrel lining sections are cup-like shells of thin sheet metal, preferably corrosion resisting metal such as stainless steel, said sections being designated 15, 16. Each of said lining sections comprises one end or head and a portion of the side or bilge of the structure, section 15 being of greater axial extent than section 16 so that the circumferential seam in the subsequently assembled structure is substantially to one side of the middle thereof. A flanged aperture or tap hole, shown at 17, is formed in the end or head of section 15, and a flanged bung hole 18 is formed in the side thereof, said bung hole being so located axially of the section as to be located exactly midway between the heads of the lining when the sections are united with each other. The lining section 16 usually is not apertured. The lining sections 15, 16 are welded together in an atomic welding apparatus subsequently to be described. During the welding operation the seam is supported, from within the hollow lining, by means of a seam-supporting structure consisting of a concatenated series of arcuate units or elements that may be arranged in ring form, within the lining, and caused yieldingly to exert radially outwardly directed pressure thereagainst, which pressure is utilized for retaining the ring in proper position axially of the lining.

The seam supporting structure consists of a plurality of intermediate units or links 20, 20, and end links 21, 21, at the respective ends of the structure, all of said links being of identical construction except end links 21, which are somewhat modified for engagement with a wedge-shaped key 22 when the links are arranged in circular form to constitute a ring. One end face of each link 20 is tapered or beveled at 23 from the upper and lower surfaces of the link toward the medial plane of the link, and the adjacent end face of the adjacent link is formed with a notch 24 of the same size as said bevel to enable interfitting of the abutting ends of the link. In like manner one end link 21 has a tapered end face and the other end link is formed with a notched end face. The links 20, 21 are loosely connected to each other by means of headed studs 25 that are secured in the beveled end of each link and project therefrom, through an aperture 26 formed in the notched end of the adjoining link, into a recess 27 formed in said adjoining link. The free end of each stud 25 is formed with a head 28 that is larger than aperture 26 to prevent separation of the links, and has a portion 29 of reduced diameter adjacent said head, said reduced portion being somewhat smaller than that portion of the stud which fits within aperture 26. The recess 27 in each link is open to the concave face thereof to give access to the stud 25 for mounting the same. The arrangement is such that the links 20, 21 may be longitudinally separated from each other to a limited extent, and when so separated they may swivel relatively of each other.

Each of the links 20, 21 is a sectional, transversely divided structure as is best shown in Figures 5 and 6 of the drawings, the sections thereof being designated 20a and 20b. The link sections of each link 20 and 21 have limited movability relatively of each other and comprise yielding means for urging said sections apart from each other. To this end section 20a has a tenon 31 secured therein by rivets 32, 32, which tenon fits within a slot 33 formed in section 20b by means of a pair of spaced apart plates 34, 34 secured to the sides of said section 20b by means of rivets 35. Said tenon and groove are disposed parallel to the plane of the links and the ring that may be constructed therefrom. Separation of link sections 20a, 20b is prevented by a pair of rivets 36, 36 that extend through plates 34, and through respective apertures 37, 37 extending transversely through tenon 31, said apertures 37 being generally oval in transverse contour so that rivets 36 may have an appreciable amount of lateral movement therein, with the result that link sections 20a, 20b are relatively movable angularly of each other to a limited extent. Mounted between link sections 20a, 20b of each link is a compression spring 38 that seats in a deep recess 39 in tenon 31 and a shallow recess 40 in the adjacent face of section 20b, said spring normally being under compression so as to urge the link sections away from each other.

Figure 4:
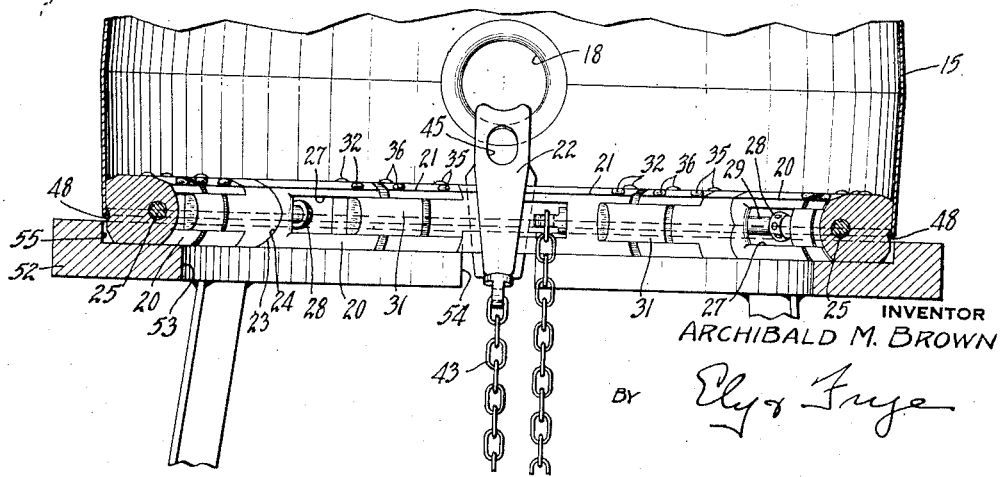
Figure 4 is a section on the line 4—4 of Figure 3.

The link sections 20a, 20b are composed of bronze, and the tenons 31 are composed of steel. On the convex side of each link the tenon has a thin brass facing plate 42 brazed thereto. The key 22 also is composed of bronze, and is connected to one of the end links 21 by means of a short length of chain 43. The lateral faces of said key taper toward its lower end, and said tapered faces are provided with respective tenons that are receivable in complementally inclined grooves formed in sloped end faces of the end links 21, 21 as is best shown in Figures 3 and 4. Said key is formed with an aperture 45 at its larger end for engagement with a suitable hooked tool 46, Figure 10, by means of which the key may be withdrawn from engagement with said end links 21. The convex peripheral face of each link 20, 20 is oblique with relation to the central plane of the link so that the annular peripheral face of the assembled seam-supporting ring is slightly frusto-conical, the arrangement being such that the ring will fit flush against the tapered inner face of the lining sections 15, 16. In transverse section the concave inner face of each link may be arcuate, and the corners of the link may be beveled so as to enable the collapsed supporting ring more easily to be withdrawn from the hollow work-structure.

The convex face of each link 20, 21 is formed with a longitudinally extending groove 48 which also is present in the facing plates 42 thereof, there also being a similar groove across the outer face of key 22, the arrangement being such as to provide a substantially continuous groove in the periphery of the annular seam-supporting structure. When the latter is disposed in horizontal position, the medial plane of the structure will be coincident with the upper margin of said groove. When the seam-supporting structure is positioned interiorly of the assembled lining sections 15, 16, said groove 48 will be disposed behind the abutting margins of said sections. The purpose of said groove presently will be explained. Every other link 20 has a recess 50 formed in its convex face, which recesses are symmetrically disposed at four points about the annular seam-supporting structure. Said recesses are located in the groove 48, being of the same width as the latter but having somewhat greater depth.

In the operation of welding a barrel lining, the seam-supporting structure is mounted within the lining section 15, the latter is then mounted in an atomic welding apparatus, and thereafter the lining section 16 is mounted in said welding apparatus and moved axially toward section 15 until the margins of the two sections are in abutting relation in circumscribing relation to the seam-supporting structure.

Considerable accuracy is required in the assembling of the seam-supporting ring within the lining section 15, and for this purpose there is provided a suitable table 52 that is circular in shape, said table having a relatively large axial opening 53, and being radially slotted at one point as shown at 54. The top of the table is formed with a depression or recess 55 that is concentric with the axis thereof and opens into the axial opening 53. At four equally spaced points on the table top are angularly movable arms 56, 56 that are pivotally secured to the table by bolts 57. Each of said arms has a nose portion at one end that is swingable over the outer edge of recess 55, the other end portion of the arm extending beyond the periphery of the table and constituting a hand grip. The arms 56 are determinately positioned with relation to the radial slot 54 in the table.

To assemble the seam-supporting ring with the lining section 15 by means of the apparatus described, the concatenated structure comprising the links 20 is arranged in circular form upon table 52 in the recess 55 thereof, the end links 21 being positioned at opposite sides of the radial slot 54 of the table. During this procedure the arms 56 are turned so that their nose portions do not extend over recess 55 of the table. After the link structure is arranged as described, the arms 56 may be turned angularly, and when so turned their nose portions will enter the respective recesses 50 formed in alternate links 20, as shown in Figures 2 and 3. Then the lining section 15, in inverted position, is mounted upon the table, in circumscribing relation to the link-structure, the margin of the said lining section resting upon the arms 56 whereby the latter support the lining section in proper position with relation to the axial dimension of the link structure, that is, with the margin of the lining section in alignment with the middle of groove 48 of the link structure. In the mounting of the lining section 15 as described, the section is so angularly positioned that its bung hole 18 is positioned in vertical alignment with the radial recess 54 of the table. The central opening 53 in the table gives access to the interior of the assembled structure and enables the key 22 now to be inserted between end links 21 of the link structure, from above, and pounded downwardly, with the result that the link structure is expanded radially outwardly against the interior of the lining 15. Such expansion of the link structure puts the springs 38 of the links under compressive stress, with the result that the links normally maintain outwardly directed pressure against the lining, and have frictional engagement therewith sufficient to prevent displacement of the link structure during subsequent manipulation of the assembly. It will be observed that when the lining structure and link structure are assembled as described, the key 22 is disposed adjacent the bung hole 18 and is accessible therethrough, as is most clearly shown in Figures 1 and 4.

Union of the lining sections 15, 16 by welding is effected by the welding apparatus shown in Figures 8 and 9. Said apparatus comprises a frame 60 that carries a stationary bearing structure 61, and a bearing structure 62 that is movable toward and away from said stationary bearing. Journaled in bearing structure 61 is a rotatable head 63, and a substantially similar rotatable head 64 is journaled in bearing structure 62. The head 63 is provided with an annular series of arms 65, 65 that extend toward head 64, the free ends of said arms being formed with respective transversely arcuate pads 65a, said arms being disposed concentrically with relation to the axis of the head and being adapted to engage and support a lining section 15. When the latter is supported by said arms, the pads 65a are substantially in end to end relation, as shown in Figure 9, and engage the lining section close to, but somewhat spaced from, the margin at the open end of the section. In like manner the head 64 is provided with arms 66 having end-pads 66a adapted to engage and support a lining section 16, said arms 66 being somewhat shorter than the arms 65. Heads 63, 64 are provided with respective ring gears 67, 68 that are meshed with respective pinions, such as the pinion 69, Figure 9, said pinions being mounted upon a shaft 70 that is driven by any suitable power means (not shown). The arrangement is such that heads 63, 64 are rotatable in unison to rotate the lining sections 15, 16 therebetween upon its own axis, in the direction indicated by the arrow in Figure 9.

The lining sections 15, 16 are firmly supported by the arms 65, 66, and during the welding operation the margins of the sections are in abutting relation, the internal seam-supporting structure assisting in maintaining said margins in truly circular condition so that they are not offset from each other at any point. The abutting margins of the work-sections 15, 16 are fused together, without the addition of metal, by the process known as atomic welding, the welding being progressively effected as the work-sections are rotated. To this end a welding head 72 is mounted above the machine, directly over the juncture of the margins of the lining sections 15, 16. Said head carries a pair of carbons 73, 73 that are electrically connected so as to create an arc at their lower ends, which are positioned adjacent each other. The head 72 may be raised or lowered to bring its arc into proper proximity to the seam to be welded, and if desired hydrogen may be ejected from the head and burned about the carbon arc to prevent oxidation of the weld. Also it is possible and frequently desirable to force hydrogen through the peripheral groove 48 of the seam-supporting structure to prevent oxidation of the weld interiorly of the lining structure. Welding of the seam is accomplished during one complete revolution of the lining structure, said seam being shown at 75 in the drawings.

Experience has shown that cracks and fissures in the finished weld may be avoided if the seam is deformed inwardly or concaved in the region thereof that is being welded. To this end a pair of presser rollers 77, 78 are arranged for engagement with the seam 75, before and behind the welding arc, said rollers being disposed between the adjacent lateral margins of the pads 65a, 66a. Roller 77, which is behind the arc, is journaled in the free end of an arm 79 that is pivotally mounted at 80 upon an upright structure 81 at the rear of the machine. Journaled on the structure 81 is a rocker arm 82 that is connected to arm 79 by toggle links 83, 84, said rocker arm also being provided with an operating lever 85 extending across the top of the machine toward the front thereof. In like manner presser roller 78 is journaled in the free end of arm 86 that is pivotally mounted at 87 upon an upright structure 88 at the front of the machine. Said structure 88 also carries a rocker arm 89 that is connected by toggle links 90, 91 to arm 86, and is provided with an operating lever 92. By means of operating levers 85, 92 the presser rollers 77, 78 are forced radially downwardly against seam 75, as the latter is being welded. It will be observed in Figure 9 that roller 77 is positioned somewhat nearer the welding head 72 than is roller 78, the arrangement enabling the fused metal of the weld to cool somewhat before passing under roller 78.

In the operation of welding together a pair of barrel-lining sections by means of a circumferential seam, the internal, concatenated, seam supporting structure comprising the links 20 is assembled with the lining section 15, upon the table 52 in the manner previously set forth. The assembled lining section and link structure is then mounted upon head 63 of the welding apparatus while movable head 64 of the latter is in the retracted position shown in broken lines in Figure 8 of the drawings. The lining section 16 is mounted upon head 64, while still retracted, after which said head is moved toward head 63 until the margins of the work-sections 15, 16 are in abutting relation. Then the heads 63, 64 are driven so as to rotate the work, carbons 73 are electrically connected to provide an arc adjacent the seam 75 at the juncture of the work-sections, and operating levers 85, 92 are manually operated to force the rollers 77, 78 downwardly against the said seam. The pressure of the rollers 77, 78 is sufficient to flex the metal to cause a slight external concavity in the work structure at the seam, which concavity is retained therein by the weld, and extends circumferentially of the finished work. The shape of said concavity is best shown in Figures 10 to 12. The forming of said concavity at the seam is accompanied by a slight collapse or circumferential shortening of the seam-supporting structure, which collapse is readily accomplished by reason of the sectional construction of the links 20 and the presence of the compression springs 38 between the sections thereof.

After the seam 75 is completely welded, the lining structure is removed from the welding machine, after which the seam-supporting structure is removed from its interior. This is readily accomplished by means of the hooked tool 46, Figure 10, that is inserted through the bung hole 18 of the lining structure and engaged in aperture 45 of the key 22. By using the tool 46 as a lever in the manner indicated by the broken lines in Figure 10, the key is easily withdrawn from wedging engagement with links 21 of the seam support, and thereafter drawn through the bung hole. This causes the seam-supporting ring to collapse, and since the key 22 is connected to the links by the chain 43, it is a simple matter to withdraw the links 20, 21 in succession from the interior of the lining structure. This completes a cycle of operation and the seam-supporting structure is ready for assembly with another lining section.

The invention results in savings due to the fact that less defective work is produced, and it achieves the other objects set out in the foregoing statements of objects.

Modification may be resorted to without departing from the spirit of the invention, or the scope thereof as defined by the appended claims.

What is claimed is:

1. The method of uniting two sections of a hollow metallic vessel by a circumferential seam which comprises mounting said sections in edge to edge abutting relation, rotating the vessel on an axis normal to the plane of said seam, progressively fusing the seam as the vessel is so rotated, concurrently applying deforming pressure to the seam only immediately in front of and behind the region where fusion is being effected, said pressure being applied to the exterior of the vessel to flex the seam inwardly, and concurrently maintaining yielding, outwardly directed pressure against the seam from the interior of the vessel.

2. Welding apparatus comprising means for mounting two sections of a hollow metallic vessel in edge to edge abutting relation, means for rotating the vessel on an axis normal to the plane of the seam formed by said abutting edges, means for progressively fusing the seam as the vessel is rotated, means for concurrently applying deforming pressure to the seam, from the exterior of the vessel, in front of and behind the region where fusion is being effected, and means for concurrently maintaining yielding outwardly directed pressure against the seam from the interior of the vessel.

3. Welding apparatus for uniting two sections of a hollow metallic vessel by a circumferential seam, said apparatus comprising an annular seam-supporting structure positionable within the vessel at the seam thereof, said structure comprising a concatenated series of arcuate links, each link being sectional and including a compression spring between the sections thereof, and a wedging key insertable between the end-links of the structure to urge it outwardly against the wall of the vessel.

4. In welding apparatus for uniting two sections of a hollow metallic vessel, an annular seam-supporting structure positionable within the vessel at the seam thereof, said structure comprising a plurality of sectioned arcuate links, studs engaging with the ends of said links to form a chain therefrom and to permit relative longitudinal movement of said links, wedging means engaged with one end of said chain for expanding a ring formed from said chain and engaging it with the vessel, the ends of said links bearing upon each other when said links are formed into said ring, and compression springs between the sections of said links whereby the vessel can be compressed slightly at the seam thereof while reinforced by said structure.

ARCHIBALD M. BROWN.